United States Patent
Sheridan et al.

(10) Patent No.: US 11,208,958 B2
(45) Date of Patent: Dec. 28, 2021

(54) METHOD OF ASSEMBLY FOR FAN DRIVE GEAR SYSTEM WITH ROTATING CARRIER

(71) Applicant: Raytheon Technologies Corporation, Farmington, CT (US)

(72) Inventors: William G. Sheridan, Southington, CT (US); Michael E. McCune, Colchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/939,291

(22) Filed: Jul. 27, 2020

(65) Prior Publication Data

US 2021/0140373 A1    May 13, 2021

Related U.S. Application Data (63) Continuation of application No. 15/860,770, filed on Jan. 3, 2018, now Pat. No. 10,724,445.

(51) Int. Cl.
*F02C 7/36* (2006.01)
*F16H 1/28* (2006.01)
(Continued)

(52) U.S. Cl.
CPC ........... *F02C 7/36* (2013.01); *F01D 25/16* (2013.01); *F01D 25/18* (2013.01); *F02C 7/06* (2013.01);
(Continued)

(58) Field of Classification Search
None
See application file for complete search history.

(56) References Cited

U.S. PATENT DOCUMENTS 2,591,743 A    4/1952  Thompson
2,684,591 A    7/1954  Lundquist
(Continued)

FOREIGN PATENT DOCUMENTS

EP    1783344    5/2007
EP    1876338    1/2008
(Continued)

OTHER PUBLICATIONS

International Search Report and Written Opinion for PCT Application No. PCT/US2014/067303 dated Mar. 13, 2015.
(Continued)

*Primary Examiner* — Colby M Hansen
(74) *Attorney, Agent, or Firm* — Carlson, Gaskey & Olds, P.C.

(57) ABSTRACT

A method of assembling a fan drive gear system for a gas turbine engine according to an example of the present disclosure includes the steps of providing a unitary carrier defining a central axis and that includes spaced apart walls and circumferentially spaced mounts defining spaced apart apertures at an outer circumference of the carrier, gear pockets defined between the walls and extending to the apertures, and a central opening in at least one of the walls. The method includes the steps of inserting a plurality of intermediate gears through the central opening, moving the intermediate gears radially outwardly relative to the central axis into the gear pockets, inserting a sun gear through the central opening, moving the plurality of intermediate gears radially inwardly relative to the central axis to engage the sun gear, and coupling a fan shaft to the carrier such that the fan shaft and intermediate gears are rotatable about the central axis. A fan drive gear system is also disclosed.

30 Claims, 10 Drawing Sheets

(51) Int. Cl.
*F16H 57/08* (2006.01)
*F02C 7/06* (2006.01)
*F01D 25/16* (2006.01)
*F01D 25/18* (2006.01)
*F02K 3/06* (2006.01)
*F16H 57/00* (2012.01)

(52) U.S. Cl.
CPC .............. *F02K 3/06* (2013.01); *F16H 1/28* (2013.01); *F16H 57/082* (2013.01); *F05D 2220/32* (2013.01); *F05D 2230/53* (2013.01); *F05D 2240/54* (2013.01); *F05D 2260/40311* (2013.01); *F05D 2260/98* (2013.01); *F16H 2057/0056* (2013.01)

(56) References Cited

U.S. PATENT DOCUMENTS

| | | |
|---|---|---|
| 2,703,021 A | 3/1955 | Stoeckicht |
| 2,749,778 A | 6/1956 | Kuhn |
| 2,830,473 A | 4/1958 | Brown |
| 2,883,885 A | 4/1959 | Upton |
| 2,968,922 A | 1/1961 | Gilbert |
| 3,160,026 A | 12/1964 | Rosen |
| 3,307,433 A | 3/1967 | Bennett et al. |
| 3,352,178 A | 11/1967 | Lindgren et al. |
| 3,459,072 A | 8/1969 | Shannon |
| 3,650,353 A | 3/1972 | Abbott |
| 3,754,484 A | 8/1973 | Roberts |
| 3,776,067 A | 12/1973 | DeBruyne et al. |
| 3,892,306 A | 7/1975 | Bertaud |
| 3,960,029 A | 6/1976 | Eichinger |
| 4,050,544 A | 9/1977 | Kalyan et al. |
| 4,227,427 A | 10/1980 | Dick |
| 4,271,928 A | 6/1981 | Northern |
| 4,378,711 A | 4/1983 | Daniel |
| 4,438,663 A | 3/1984 | Eichenberger et al. |
| 4,455,888 A | 6/1984 | Wayman et al. |
| 4,467,670 A | 8/1984 | Kawamoto |
| 4,528,870 A | 7/1985 | Van Deursen et al. |
| 4,583,413 A | 4/1986 | Lack |
| 4,657,410 A | 4/1987 | Hibner |
| 4,784,018 A | 11/1988 | Okada et al. |
| 4,950,213 A | 8/1990 | Morisawa |
| 5,058,452 A | 10/1991 | El-Shafei |
| 5,102,379 A | 4/1992 | Pagluica et al. |
| 5,433,674 A | 7/1995 | Sheridan et al. |
| 5,466,198 A | 11/1995 | McKibbin et al. |
| 5,472,059 A | 12/1995 | Schlosser et al. |
| 5,472,383 A | 12/1995 | McKibbin |
| 5,643,126 A | 7/1997 | Hotta et al. |
| 5,685,797 A | 11/1997 | Barnsby et al. |
| 5,830,098 A | 11/1998 | Kimes |
| 6,223,616 B1 | 5/2001 | Sheridan |
| 7,338,404 B2 | 3/2008 | Gassmann |
| 7,442,143 B2 | 10/2008 | Gassmann |
| 7,704,178 B2 | 4/2010 | Sheridan et al. |
| 8,172,717 B2 | 5/2012 | Lopez et al. |
| 8,205,432 B2 | 6/2012 | Sheridan |
| 8,276,275 B2 | 10/2012 | Sheridan |
| 8,484,942 B1 | 7/2013 | McCune et al. |
| 8,667,688 B2 | 3/2014 | McCune et al. |
| 8,678,743 B1 | 3/2014 | Sheridan |
| 8,763,251 B2 | 7/2014 | McCune et al. |
| 8,939,714 B1 | 1/2015 | McCune et al. |
| 8,974,344 B2 | 3/2015 | McCune et al. |
| 9,038,779 B2 | 5/2015 | McCune et al. |
| 9,068,629 B2 | 6/2015 | Sheridan |
| 9,133,729 B1 | 9/2015 | McCune et al. |
| 9,404,420 B2 | 8/2016 | Gallet et al. |
| 9,677,420 B2 | 6/2017 | McCune et al. |
| 9,739,206 B2 | 8/2017 | Houston et al. |
| 9,970,352 B2 | 5/2018 | Sheridan |
| 9,995,177 B2 | 6/2018 | Sheridan |
| 2008/0044276 A1 | 2/2008 | McCune et al. |
| 2008/0112798 A1 | 5/2008 | Seitzer et al. |
| 2009/0090096 A1 | 4/2009 | Sheridan |
| 2010/0035719 A1 | 2/2010 | Wang |
| 2010/0150702 A1 | 6/2010 | Sheridan et al. |
| 2010/0154217 A1 | 6/2010 | Sheridan et al. |
| 2010/0160105 A1 | 6/2010 | Sheridan et al. |
| 2010/0180571 A1 | 7/2010 | Zysman et al. |
| 2010/0261571 A1 | 10/2010 | Matsuoka et al. |
| 2012/0088624 A1 | 4/2012 | Sheridan |
| 2012/0167593 A1 | 7/2012 | Suciu et al. |
| 2012/0192570 A1 | 8/2012 | McCune et al. |
| 2012/0216545 A1 | 8/2012 | Sennoun et al. |
| 2013/0023378 A1 | 1/2013 | McCune |
| 2014/0045645 A1 | 2/2014 | McCune et al. |
| 2014/0154054 A1 | 6/2014 | Sheridan |
| 2014/0206496 A1 | 7/2014 | McCune et al. |
| 2016/0319830 A1 | 11/2016 | Sheridan et al. |
| 2016/0377165 A1 | 12/2016 | Sheridan |
| 2017/0261096 A1 | 9/2017 | Bradley et al. |
| 2020/0395878 A1* | 12/2020 | Takahashi ............... B60L 15/20 |
| 2021/0003016 A1* | 1/2021 | Theertham ............ F01D 11/008 |
| 2021/0131289 A1* | 5/2021 | Whitaker ............... F01D 5/187 |

FOREIGN PATENT DOCUMENTS

| | | |
|---|---|---|
| JP | 60252857 | 12/1985 |
| JP | 61130656 | 6/1986 |
| JP | 62166365 | 7/1987 |
| WO | 2012098108 | 7/2012 |
| WO | 2014099087 | 6/2014 |
| WO | 2014182467 | 11/2014 |

OTHER PUBLICATIONS

European Search Report for EP Application No. 14877520.8 dated Nov. 13, 2017.

International Preliminary Report on Patentability for PCT Application No. PCT/US2014/067303 dated Jul. 14, 2016.

International Preliminary Report on Patentability for International Application No. PCT/US2013/062220 dated Apr. 9, 2015.

International Search Report and Written Opinion for International Application No. PCT/US2013/062220 dated Aug. 15, 2014.

Supplementary European Search Report for European Application No. 13865131.0 dated Apr. 26, 2016.

European Search Report for European Patent Application No. 19150260.8 completed May 28, 2019.

* cited by examiner

METHOD OF ASSEMBLY FOR FAN DRIVE GEAR SYSTEM WITH ROTATING CARRIER

CROSS-REFERENCE TO RELATED APPLICATION

The present disclosure is a continuation of U.S. patent application Ser. No. 15/860,770 filed Jan. 3, 2018.

BACKGROUND

This application relates to fan drive gear systems, and more particularly to assembly of a fan drive gear system having an epicyclic gear train with a rotating carrier that can be incorporated in a gas turbine engine to drive a turbo fan.

Gas turbine engines may employ an epicyclic gear train connected to a turbine section of the engine, which is used to drive the turbo fan through an output shaft. In a typical epicyclic gear train, a sun gear receives rotational input from a turbine shaft through a turbine shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to the output shaft that drives the turbo fan. In arrangements in which the ring gear is fixed against rotation, the intermediate gears are referred to as "planetary" gears and the carrier is coupled to the output shaft that drives the turbo fan. The output shaft can be supported by a bearing assembly. The bearing assembly and gear train include rotatable components that require lubrication during operation.

The carrier housings are typically split along a central plane, with assembly of the gear train including bringing together and securing the halves of the carrier housing. For improved strength and rigidity, as compared with a two-part housing, it is desirable for an epicyclic gear train to have a unitary carrier housing.

SUMMARY

A method of assembling a fan drive gear system for a gas turbine engine according to an example of the present disclosure includes the steps of providing a unitary carrier defining a central axis and that includes spaced apart walls and circumferentially spaced mounts defining spaced apart apertures at an outer circumference of the carrier, gear pockets defined between the walls and extending to the apertures, and a central opening in at least one of the walls. The method includes the steps of inserting a plurality of intermediate gears through the central opening, moving the intermediate gears radially outwardly relative to the central axis into the gear pockets, inserting a sun gear through the central opening, moving the plurality of intermediate gears radially inwardly relative to the central axis to engage the sun gear, and coupling a fan shaft to the carrier such that the fan shaft and intermediate gears are rotatable about the central axis.

In a further embodiment of any of the foregoing embodiments, the step of coupling the fan shaft includes attaching a torque frame to the carrier such that the torque frame is rotatable about the central axis.

In a further embodiment of any of the foregoing embodiments, the torque frame has a plurality of axially extending fingers which are received within slots defined by one of the walls of the carrier, at locations circumferentially intermediate locations of the intermediate gears.

A further embodiment of any of the foregoing embodiments includes placing a ring gear includes a first ring half and a second ring gear half on an outer periphery of the sun gears to engage the intermediate gears, including moving the first ring gear half such that the first ring gear half does not block radially inwardly extending apertures in a radially outer surface of the carrier, and moving pins into the apertures to lock the fingers within the slots, and then moving the first ring gear half over the apertures. The second ring gear half is placed on the intermediate gears subsequent to the locking of the fingers within the slots.

In a further embodiment of any of the foregoing embodiments, the torque frame defines a frustro-conical geometry including a first end portion attached to the carrier and that tapers toward a second end portion coupled to the fan shaft.

In a further embodiment of any of the foregoing embodiments, the torque frame is integral with the fan shaft.

A further embodiment of any of the foregoing embodiments includes placing a ring gear on an outer periphery of the sun gears to engage the intermediate gears, moving the carrier along an engine longitudinal axis, fixedly attaching the ring gear to an engine static structure, and coupling a fan shaft to the carrier such that the fan shaft and intermediate gears are rotatable about the engine longitudinal axis.

In a further embodiment of any of the foregoing embodiments, the step of fixedly attaching the ring gear includes interconnecting the ring gear and the engine static structure with a flexible support.

A further embodiment of any of the foregoing embodiments includes interconnecting the sun gear and a turbine shaft with a flexible input coupling, and securing the fan shaft to a fan hub that supports a plurality of fan blades.

A further embodiment of any of the foregoing embodiments includes moving a first tapered bearing assembly along the engine longitudinal axis to position the first tapered bearing assembly about an outer periphery of the fan shaft.

A further embodiment of any of the foregoing embodiments includes moving a lubricant transfer bearing assembly along the engine longitudinal axis to position the lubricant transfer bearing about the outer periphery of the fan shaft, the lubricant transfer bearing assembly for transferring lubricant between the fan shaft and a bearing support, moving a lubricant manifold to interconnect the lubricant transfer bearing assembly and a plurality of journal bearings that support the intermediate gears, and moving a second tapered bearing assembly along the engine longitudinal axis to position the second tapered bearing assembly about the outer periphery of the fan shaft such that the lubricant transfer bearing assembly is between the first and second tapered bearing assemblies.

A further embodiment of any of the foregoing embodiments includes moving the bearing support along the central axis to support the first and second tapered bearing assemblies, and then fixedly attaching the bearing support to the engine static structure.

A further embodiment of any of the foregoing embodiments includes placing a ring gear on an outer periphery of the sun gears to engage the intermediate gears, and then fixedly attaching the ring gear to an engine static structure.

In a further embodiment of any of the foregoing embodiments, the sun gear and the intermediate gears are each formed as a single gear. The ring gear is formed as a two-part gear that has a first ring gear half and a second ring gear half, and the step of placing the ring gear includes placing each of the first ring gear half and the second ring gear half about the outer periphery of the intermediate gears.

In a further embodiment of any of the foregoing embodiments, the sun gear and the intermediate gears have two spaced portions. Each of the portions have helical gear teeth, with the helical gear teeth on the two portions extending in opposed directions. The ring gear includes two ring gear halves each having one direction of helical gear teeth, with the helical gear teeth on the two ring gear halves extending in opposed directions.

In a further embodiment of any of the foregoing embodiments, the step of moving the plurality of intermediate gears radially inwardly occurs after the step of inserting the sun gear. The step of coupling the fan shaft includes attaching a torque frame to the carrier such that the torque frame is rotatable about the central axis, and further includes inserting journal bearings within each of the intermediate gears after the steps of moving the plurality of intermediate gears radially inwardly and attaching the torque frame.

A fan drive gear system for a gas turbine engine according to an example of the present disclosure include a unitary carrier that defines a central axis and has a pair of axially spaced apart side walls, and axially extending circumferentially spaced mounts that connect the side walls, a central opening in one of the walls, and circumferentially spaced smaller openings spaced radially outwardly of the central opening, with internal surfaces of circumferentially spaced curved walls of the mounts defining intermediate gear pockets that extend away from the central opening, and the intermediate gear pockets dimensioned to receive intermediate gears. The intermediate gears are received through the central opening, and secured at a position spaced radially inwardly of a radially outermost area in the intermediate gear pockets relative to the central axis, with the intermediate gears having teeth engaged with teeth of a sun gear received in the central opening. A ring gear is received at radially outer locations such that ring gear teeth engage teeth of the intermediate gears, and a torque frame interconnects the carrier and a fan shaft such that the fan shaft and intermediate gears are rotatable about the central axis.

In a further embodiment of any of the foregoing embodiments, the torque frame has a plurality of axially extending fingers received within slots defined by one of the walls of the carrier, at locations circumferentially intermediate locations of the intermediate gears, and pins inwardly of radially inwardly extending apertures in a radially outer surface of the carrier. The pins lock the fingers within the slots, with the ring gear received radially outwardly of the radially inwardly extending apertures. The torque frame is integral with the fan shaft, and defines a frustro-conical geometry that has a first end portion attached to the carrier and that tapers toward a second end portion coupled to the fan shaft.

A further embodiment of any of the foregoing embodiments includes a flexible support interconnecting the ring gear and an engine static structure, and a flexible input coupling interconnecting the sun gear and a turbine shaft. The fan shaft drives a fan hub that supports a plurality of fan blades.

A further embodiment of any of the foregoing embodiments includes pair of tapered bearing assemblies about an outer periphery of the fan shaft, the pair of tapered bearings attached to a bearing support, and a lubricant transfer bearing assembly between the pair of tapered bearing assemblies and that transfers lubricant between the fan shaft and the bearing support.

BRIEF DESCRIPTION OF THE DRAWINGS

Like reference numbers and designations in the various drawings indicate like elements.

DETAILED DESCRIPTION

Figure 1:
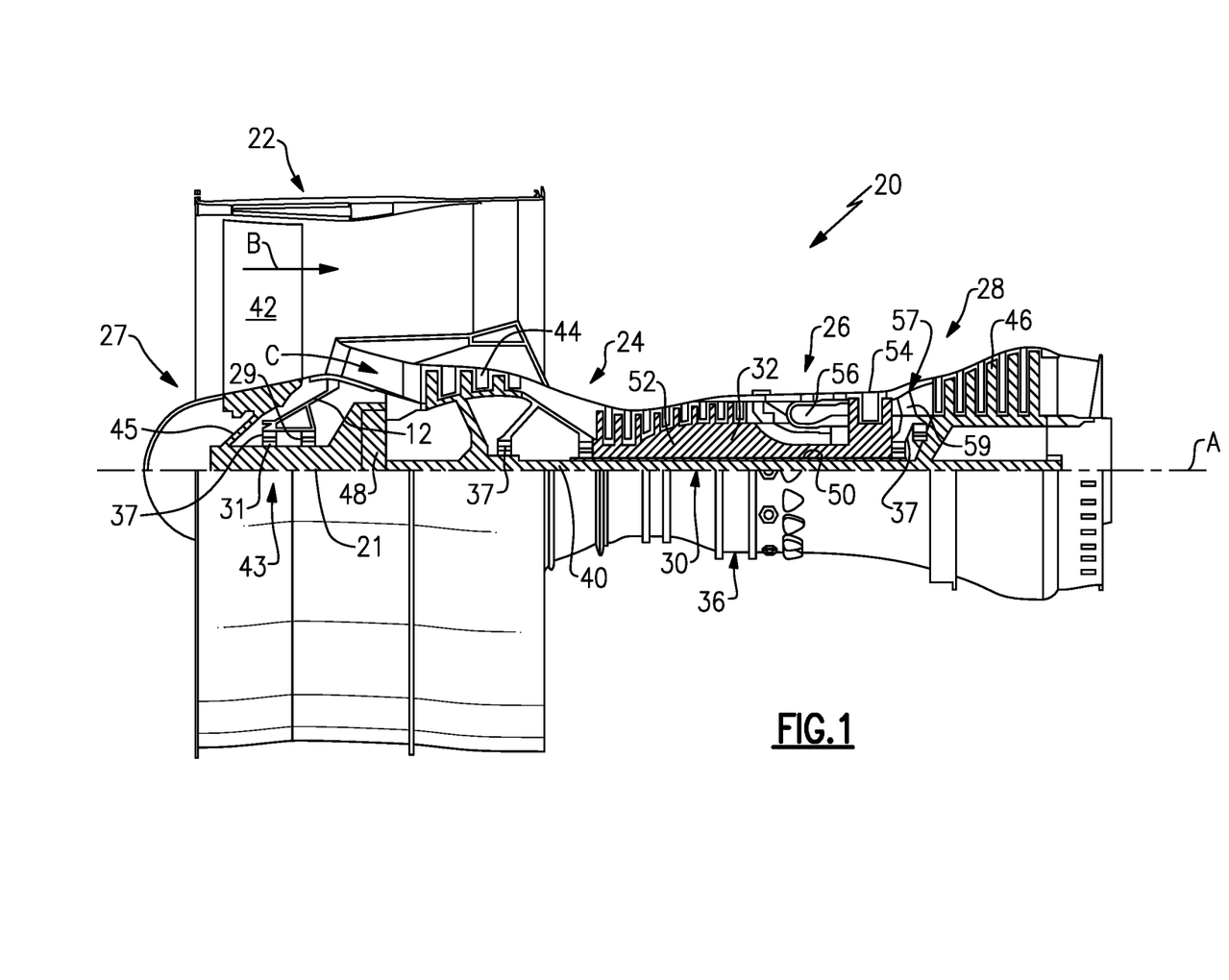
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 37. It should be understood that various bearing systems 37 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 37 in the turbine section 28. The inner shaft 40 and the outer shaft 50 are concentric and rotate via bearing systems 37 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second.

The engine 20 is provided with a fan gear drive system 27 that includes the geared architecture 48 and a shaft assembly 43 driven by an output of the geared architecture 48. The shaft assembly 43 includes a fan shaft 21 mechanically attached or otherwise secured to a fan hub 45 that supports a plurality of fan blades (one shown) of the fan 42. One of the bearing systems 37 is coupled to a bearing support 12 that at least partially surrounds the fan shaft 21. The bearing system 37 includes one or more bearing assemblies 29, 31 that support the fan shaft 21.

Figure 2:
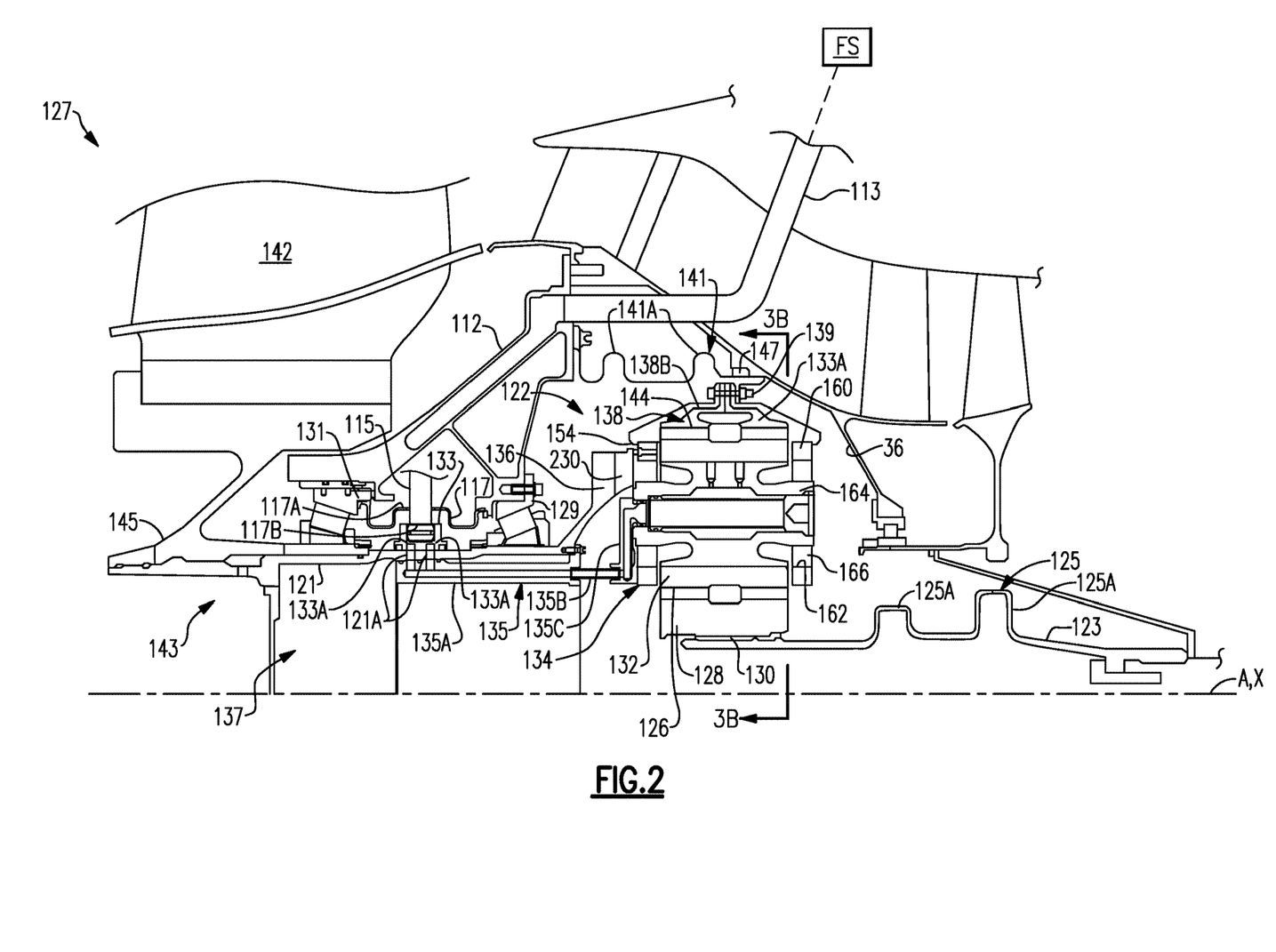
FIG. 2 is a cross-sectional view of a fan drive gear system including an epicyclic gear train and a shaft assembly.

FIG. 2 illustrates a fan drive gear system 127 that can be incorporated into a gas turbine engine, such as the engine 20 of FIG. 1. The geared architecture 48 of FIG. 1 may be assembled as described below for gear train 122. The gear train 122 can be incorporated in the fan drive gear system 127 to drive a shaft assembly 143. Assembly of the fan drive gear system 127, including mounting the gear train 122 and shaft assembly 143 to engine static structure 36 of the engine 20, are described below. In the example arrangement, the epicyclic gear train 122 is a planetary gear train including a stationary or fixed ring gear 138 and a carrier 134 that rotates with a fan 142 about the engine longitudinal axis A during operation of the engine 20. Other epicyclic gear trains can benefit from the teachings herein, including a star arrangement.

The epicyclic gear train 122 includes a sun gear 128 that is connected to an input or turbine shaft 123, which provides rotational input, by a splined connection 130. Turbine shaft 123 can be mechanically attached to or form a portion of inner shaft 40 (FIG. 1), for example, to drive the sun gear 128.

The gear train 122 defines a central axis X extending through the sun gear 128 that can be parallel or collinear with the engine longitudinal axis A. The carrier 134 supports planetary or intermediate gears 132 that are coupled to the sun gear 128 by meshed interfaces 126 between the teeth of the sun gear 128 and the intermediate gears 132.

A ring gear 138 surrounds the carrier 134 and is coupled to the intermediate gears 132 by meshed interfaces 144. The ring gear 138 is a two-part ring gear formed by first and second ring gear halves 138A/B that can be symmetrical. In alternative examples, the ring gear 138 is formed as a single gear. The ring gear 138 is fixedly attached to a portion of the engine static structure 36, such as a housing or bearing support 112. The ring gear 138 grounds the gear train 122 to the engine static structure 36 such that the ring gear 138 is fixed against rotation about the engine longitudinal axis A during operation of the engine 20.

A flexible input coupling 125 can interconnect the sun gear 128 and the turbine shaft 123. A flexible support 141 can interconnect the ring gear 138 and the bearing support 112. The flexible input coupling 125 and flexible support 141 can include one or more respective undulations 125A, 141A that deflect to permit rotation and axial movement of the gear train 122 relative to the turbine shaft 123 and/or engine static structure 36 which may be caused by rotational and axial loads from the fan 142, for example. The ring gear halves 138A/B and flexible support 141 can be mechanically attached by a connection 139 including one or more fasteners. The flexible support 141 can at least partially surround the carrier 134 when in an installed position. The flexible support 141 can selectively engage or contact a deflection limiter 147. The deflection limiter 147 can be defined by one or more slots in the engine static structure 36, for example, that engage surfaces of the flexible support 141 to bound circumferential and/or radial movement of the gear train 122. In alternative examples, the flexible input coupling 125 and/or the flexible support 141 are omitted, with the sun gear 128 interconnected to the turbine shaft 123 and/or the ring gear halves 138A/B attached to the engine static structure 36.

The shaft assembly 143 includes a turbo fan shaft 121 coupled to the carrier 134 such that the fan shaft 121 and intermediate gears 132 are rotatable about the central axis X. The carrier 134 is fixedly attached to the fan shaft 121 by a torque frame 136. The fan shaft 121 is mechanically attached or otherwise secured to a fan hub 145 that supports a plurality of fan blades (one shown) of the fan 142. The carrier 134 and torque frame 136 are rotatable about the central axis X to provide rotational output to the fan shaft 121 to drive the fan 142. The fan hub 145 is mechanically attached to and supported by an outer periphery of the fan shaft 121.

Bearing system 137 includes at least one bearing assembly to support the fan shaft 121. In the illustrated example of FIG. 2, bearing system 137 includes a first bearing assembly 129 and a second bearing assembly 131 forward of the gear train 122 to support rotation of the fan shaft 121.

Each of the bearing assemblies 129, 131 includes a carrier and bearing. The assemblies 129, 131 can be tapered roller bearing assemblies that are arranged to counteract radial and thrust loads, for example.

The bearing support 112 can be coupled to a lubricant passage 113 for communicating lubricant between a fluid source FS and the bearing system 137. The bearing system 137 includes a stationary lubricant transfer bearing assembly 133 for transferring lubricant between the fan shaft 121 and the bearing support 112.

The bearing assemblies 129, 131, 133 are arranged or positioned about an outer periphery of the fan shaft 121 such that bearing assembly 133 is axially between bearing assemblies 129, 131. The bearing assemblies 129, 131 can be axially spaced apart by a flexible spacer 117, which can provide a preload on the bearings assemblies 129, 131. The flexible spacer 117 can include at least one undulation 117A to permit axially movement between the bearings assemblies 129, 131, and defines an aperture 117B for receiving a feeder tube 115.

The feeder tube 115 extends from the bearing support 112 is fluidly coupled to the lubricant transfer bearing assembly 133. The feeder tube 115 communicates lubricant supplied from the lubricant passage 113 to the bearing assembly 133. The bearing assembly 133 includes openings 133A that supply lubricant to an outer periphery of the fan shaft 121. The openings 133A can be races defined in an inner periphery of the bearing assembly 133 that extend through in the fan shaft 121 and communicate lubricant with a plurality of passages 121A. The passages 121A can be substantially axially aligned with the openings 133A.

The lubricant transfer bearing assembly 133 is fluidly coupled to a lubricant manifold 135 including interconnected conduits or segments 135A/B/C that define internal fluid passages for communicating lubricant between the bearing support 112 and the gear train 122. In the illustrated example of FIG. 2, the segment 135B is a jumper tube that interconnects axially extending segment 135A and radially outwardly extending segment 135C. Lubricant from the passages 121A is supplied to the first segment 135A, and then to the other segments 135B/135C. From the third segment 135C of the lubricant manifold 135, lubricant is supplied to a respective journal bearing 164 for distribution to other portions of the gear train 122. The arrangement of the lubricant transfer bearing assembly 133 and lubricant manifold 135 can deliver relatively high pressure lubricant to the journal bearings 164, such as above about pounds per square inch (PSI), or more narrowly between about 200-300 PSI. In this example, a single set of segments 135A/B/C is shown. However, a plurality of the segments 135A/B/C can be utilized to communicate lubricant to different parts of the gear train 122.

The torque frame 136 is mechanically attached to the carrier 134. As shown in FIG. 8E, the carrier 134 includes connecting structure defining mounts 154 having a plurality of apertures or slots 156 receiving a plurality of elongated fingers 230 of the torque frame 136, with pins 148 extending through spherical bearings 146 and bushings 152 securing the fingers 230 to the carrier 134. Fasteners 150 retain the pins 148 to the carrier 134, also shown in FIG. 8E. The torque frame 136 interconnects the carrier 134 and the fan shaft 121 such that the fan shaft 121 and intermediate gears 132 are rotatable about the engine longitudinal axis A.

Figure 3A:
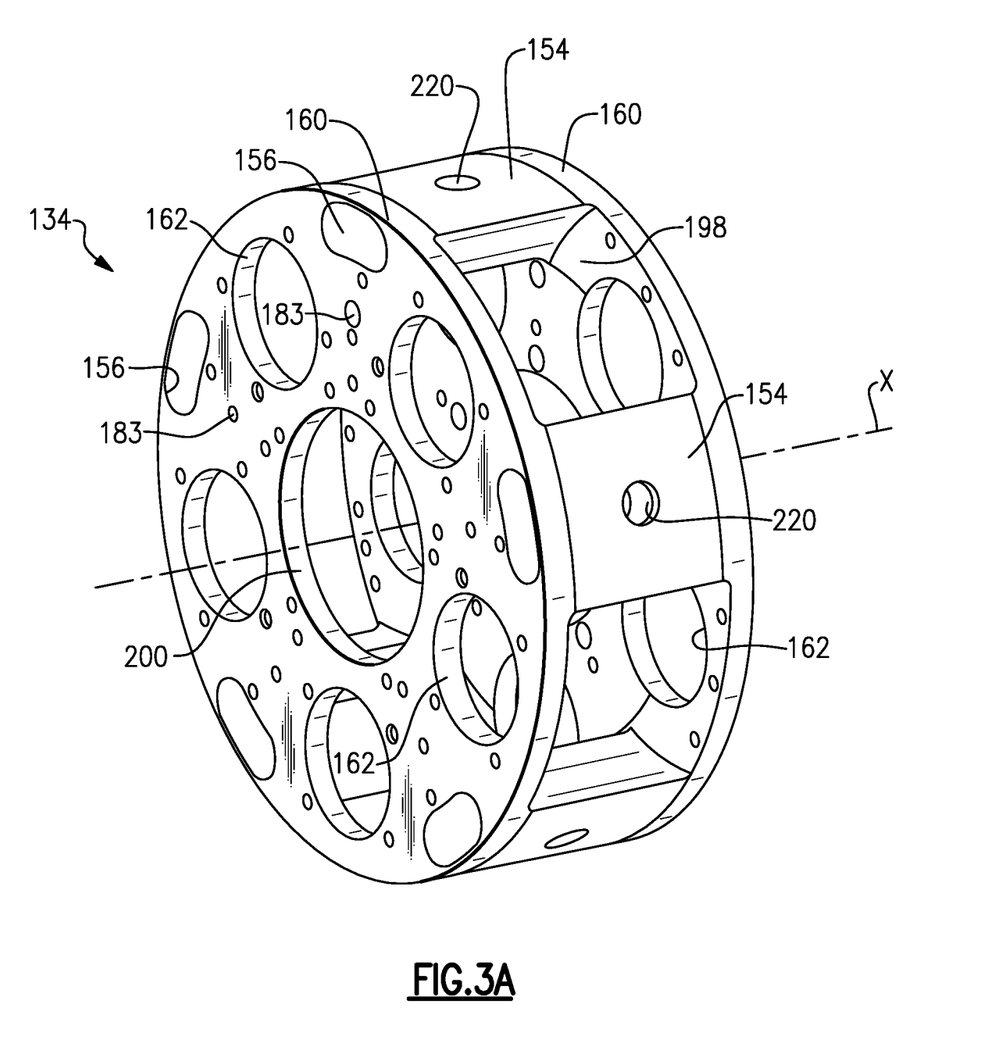
FIG. 3A shows a unitary carrier.
Figure 3B:
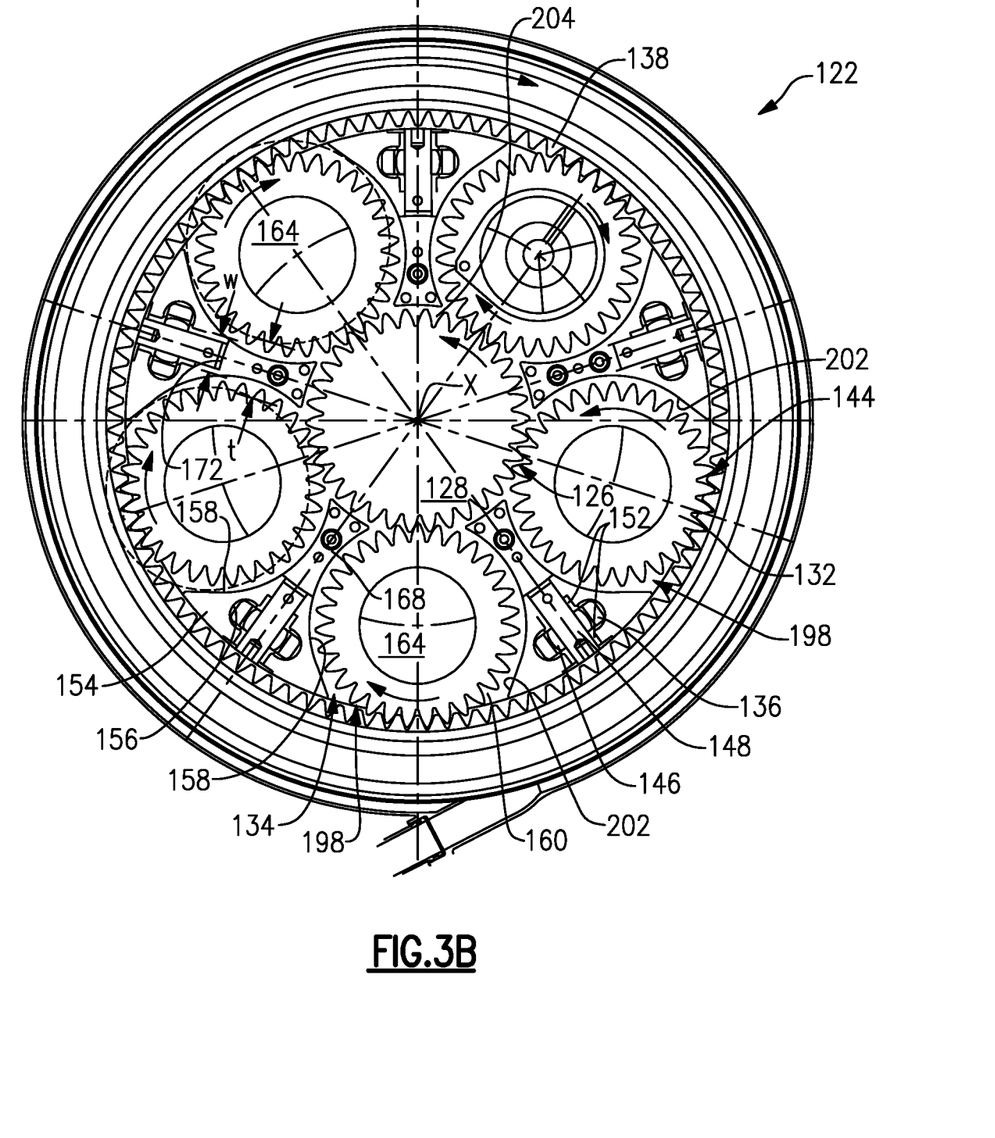
FIG. 3B illustrates an end view of the epicyclic gear train taken along line 3B-3B in FIG. 2 with intermediate gears and a star gear in an installation position.

Referring to FIGS. 3A and 3B, with continued reference to FIG. 2, the carrier 134 can be a unitary structure constructed or manufactured from one piece for improved structural strength, rigidity and integrity, as compared with two-part housings. Carrier 134 is centered on the central axis X. Carrier 134 includes axially spaced apart side walls 160 that are interconnected by the circumferentially spaced and axially extending connecting structure defining mounts 154, which are generally wedge-shaped members. The mounts 154 and side walls 160 are unitary with one another. That is, these components are fixed, such as by being welded or cast as a unitary structure, prior to assembly of the gear train 122. The mounts 154 have opposing curved surfaces 158 that are in close proximity to the intermediate gears 132 and generally follow the curvature of the teeth of the intermediate gears 132 to guide lubricant on the curved surfaces 158 toward the intermediate gears 132 for additional lubrication.

The mounts 154 are circumferentially spaced about the carrier 134 to define apertures 198 through which the intermediate gears 132 extend to engage the ring gear 138. The side walls 160 include holes 162 for receiving respective journal bearings 164 that support each of the intermediate gears 132. Each journal bearing 164 is retained within the carrier 134 by retainers 166 fastened to the side walls 160.

The carrier 134 defines a central opening 200 along the central axis X. The central opening 200 can be machined in at least one of the side walls 160 and defines gear pocket 204 for receiving the sun gear 128. The central opening 200 is dimensioned to accommodate insertion of the sun gear 128 and each of the intermediate gears 132. Intermediate gear pockets 202 can be machined between the side walls 160 and mounts 154 for each of the intermediate gears 132 and form circumferentially distributed apertures 198 at an outer circumference of the carrier 134. The intermediate gear pockets 202 are dimensioned to receive respective intermediate gears 132. The mounts 154 can be circumferentially spaced about the carrier 134 at a distance that is less than a width of the gears 128, 132 such that the gear pockets 202, 204 can only be accessed through the central opening 200, which can provide improved strength and rigidity of the carrier 134.

Figure 4:
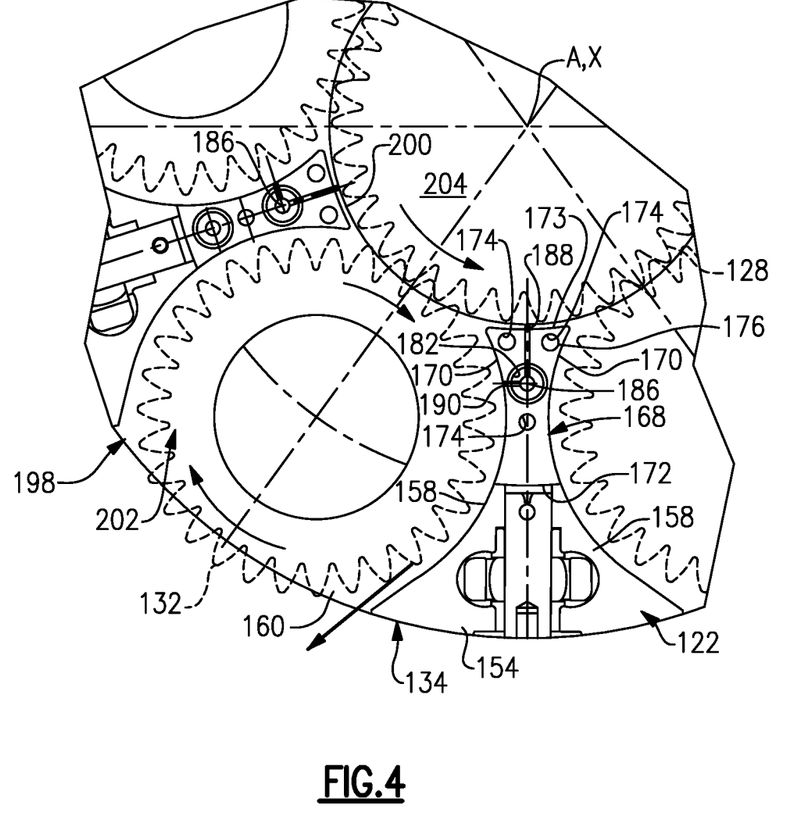
FIG. 4 is an enlarged view of a portion of the epicyclic gear train of FIG. 3 with the sun gear and intermediate gears shown in phantom.

Referring to FIG. 4, oil baffles 168 can be arranged between the side walls 160 near each of the mounts 154. The baffles 168 include ends 172 that abut the mounts 154. The baffles 168 include opposing curved surfaces 170 arranged in close proximity to the intermediate gears 128. The curved surfaces 158, 170 can be contiguous with and adjoin one another, and define the gear pockets 202 that are dimensioned to receive respective intermediate gears 132. The gear pocket 204 is defined between a surface 173 of each of the baffles 168 opposite the ends 172 and is dimensioned to receive the sun gear 128.

Figure 5A:
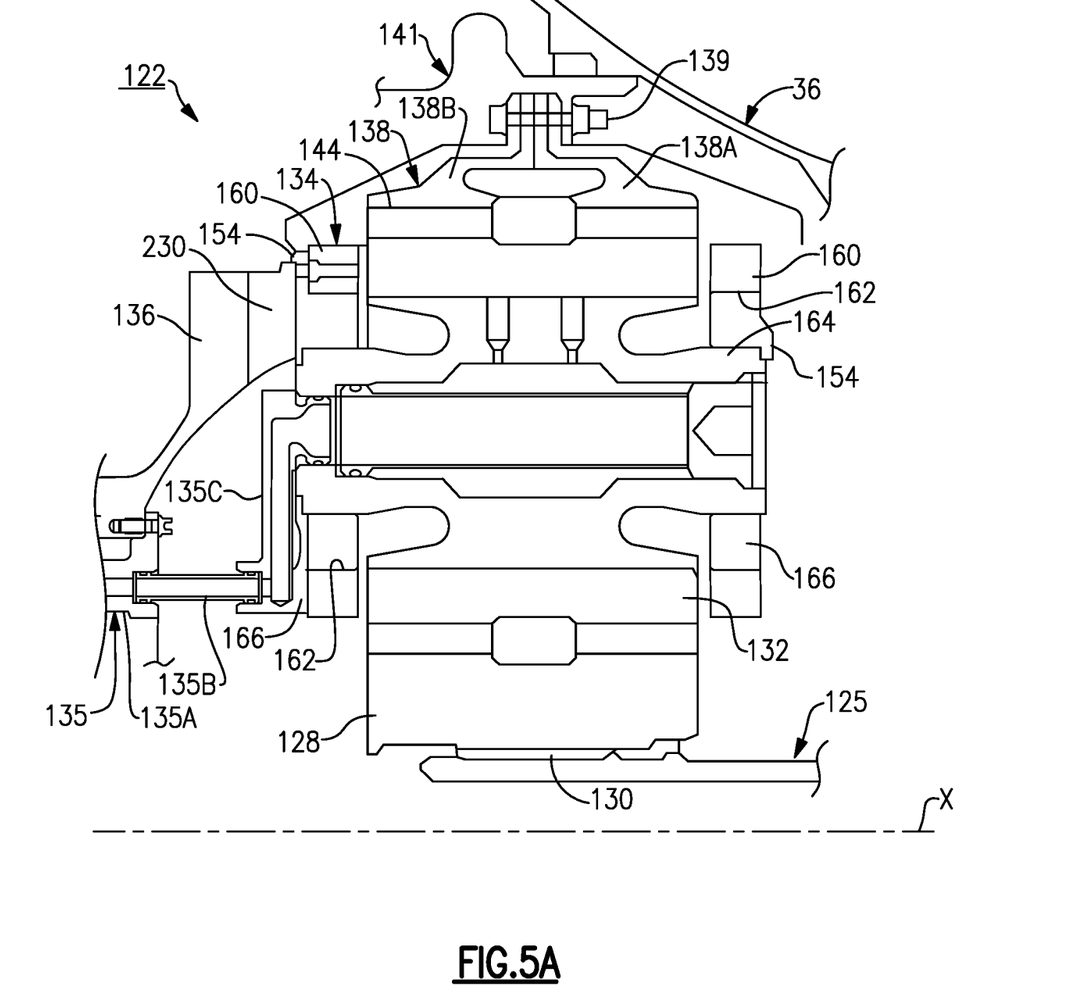
FIG. 5A is an enlarged view of a portion of the epicyclic gear train of FIG. 2.
Figure 5B:
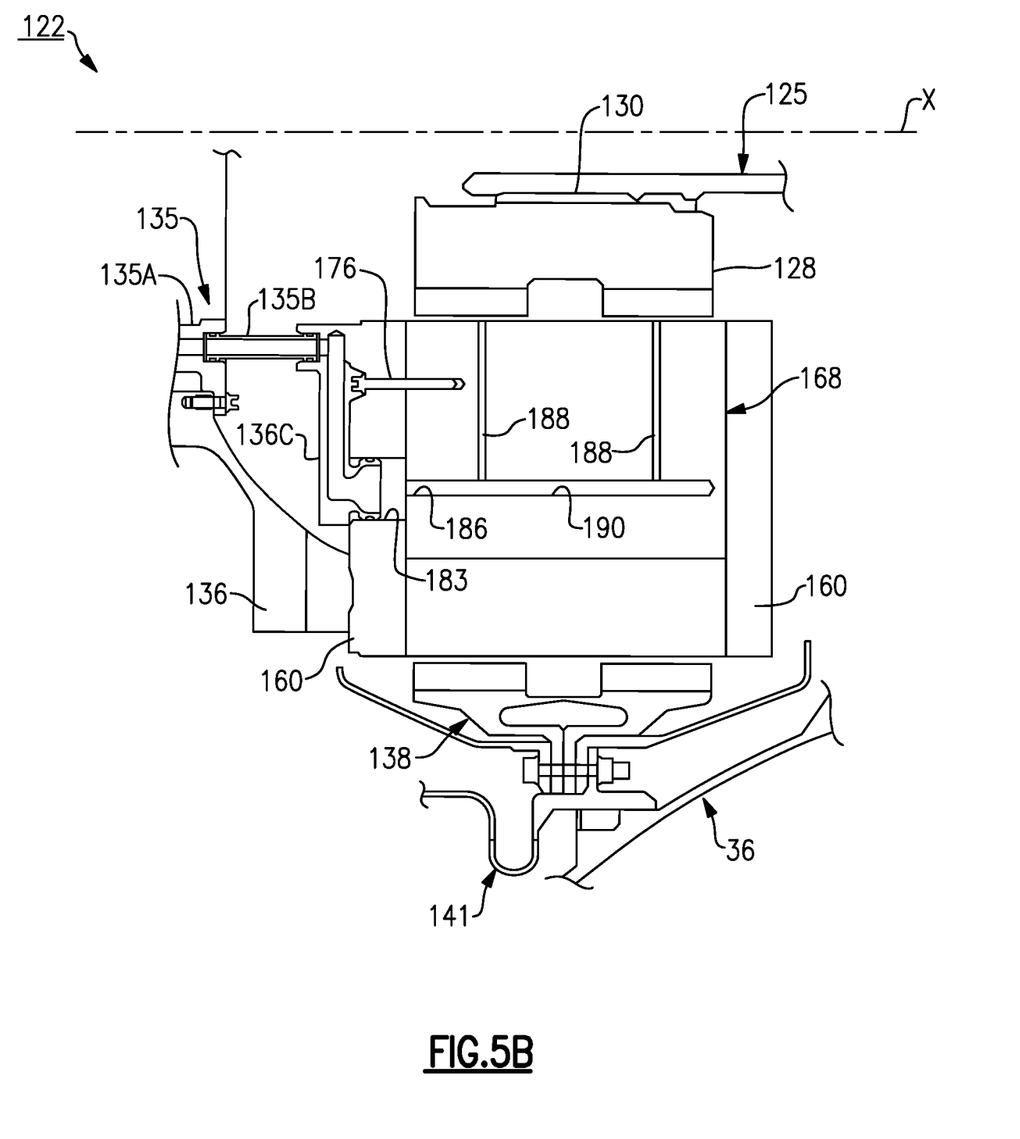
FIG. 5B is another enlarged view of a portion of the epicyclic gear train of FIG. 2.

Each of the side walls 160 includes holes 174 that receive fasteners 176 which secure the baffles 168 to the carrier 134 (see also FIG. 5B). The baffles 168 establish a lubrication passage provided by a primary passage 186 that fluidly communicates with the lubricant manifold 135. The baffles 168 can include openings 182 that receive a respective segment 135C (FIG. 2) of the lubricant manifold 135 that extends through a hole 183 in the side wall 160. The primary passage 186 is in communication with first and second passages 188, 190 that spray lubricant on the teeth of the sun and intermediate gears 128, 132. The passages 188, 190 can be arranged about ninety degrees from one another, for example. Lubricant distribution is integrated into the baffles 168 so that separate components can be eliminated, which can reduce weight and complexity of the gear train 122. The baffles 168 can be constructed from the same or a different, relatively lighter weight material than the carrier 134.

Referring to FIGS. 5A and 5B, which are sectional views of the gear train 122, segment 135A of the lubricant manifold 135 is mechanically attached to the torque frame 136. Segment 135B spans between the segments 135A/C. An end portion of segment 135C extends through an opening of the wall 160 of the carrier 134 and communicates lubricant between the fluid source FS and the journal bearing 164, as shown in FIG. 5A. An end portion of another segment 135C extends through another opening of the wall 160 of the carrier 134 and communicates lubricant between the fluid source FS and the baffle 168, as shown in FIG. 5B. As shown in FIG. 5B, the baffle 168 can include passages 186, 188, 190 for spraying or otherwise communicating lubricant to the sun gear 128 (see also FIG. 4). Although FIGS. 5A and 5B show only one set of segments 135A/B/C communicating fluid with the journal bearing 164 and another set of segments 135A/B/C communicating fluid with the baffle 168, it should be appreciated that the lubricant manifold 135 can have a plurality of segments 135A/B/C each fluidly coupled to a respective journal bearing 164 or baffle 168.

Figure 6:
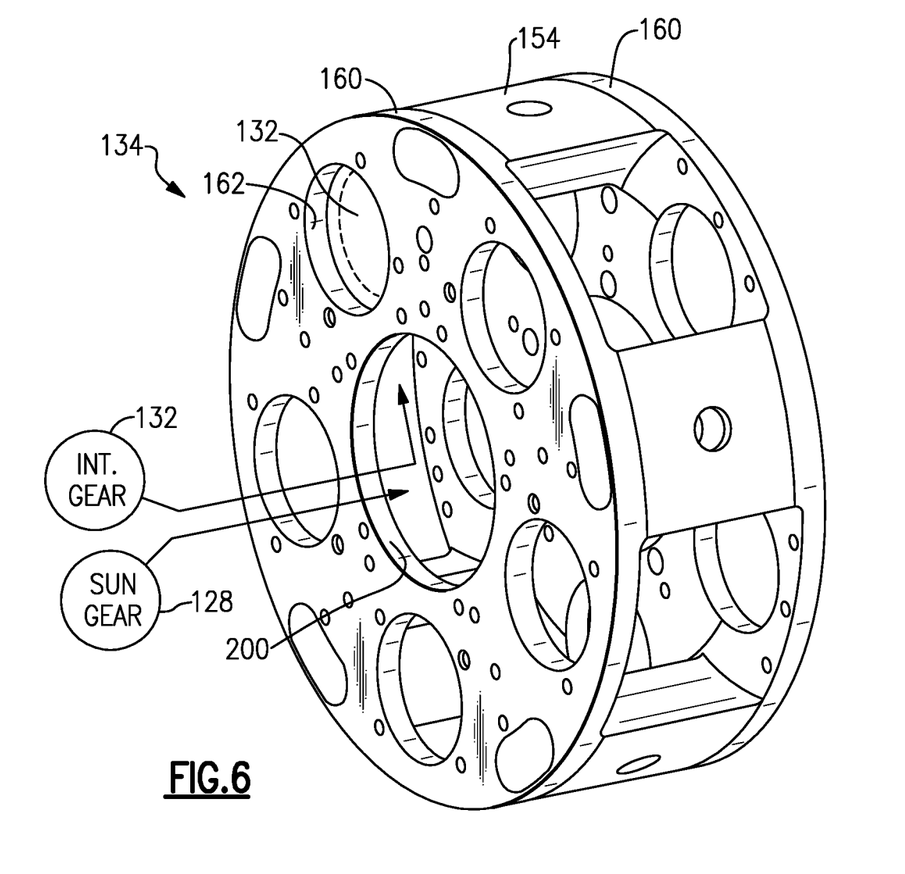
FIG. 6 illustrates sun and intermediate gears being inserted into the carrier of FIG. 3A.

Returning to FIG. 3B, and with reference to FIG. 6, the intermediate gears 132 are inserted into the central opening 200 and moved radially outwardly relative to the central axis X such that the intermediate gears 132 extend through the apertures 198 and can be positioned in abutment with the mounts 154 (position indicated by dashed lines in FIG. 3B). In this position, there is an adequate gap (t) between the teeth of adjacent intermediate gears 132 to accommodate a width (w) of the ends 172 of the adjacent baffles 168. After the baffles 168 have been inserted, the sun gear 128 can be inserted into the central opening 200. The intermediate gears 132 can then be moved radially inwardly relative to the central axis X to mesh with the sun gear 128. The baffles 168 are secured to the carrier 134 using fasteners 176 (FIG. 4). The tubes 180 can be inserted and the rest of the lubricant distribution system can be connected.

As mentioned above, the intermediate gears 132 are initially inserted within the central hole 200 for the sun gear 128. The intermediate gears 132 are moved radially outwardly relative to the central axis X, and the baffles 168 are inserted. The sun gear 128 is then inserted, and the intermediate gears 132 can then be moved radially inwardly relative to the central axis X to engage the sun gear 128. All of this assembly occurs with the carrier 134 already formed as a unitary structure.

Figure 7:
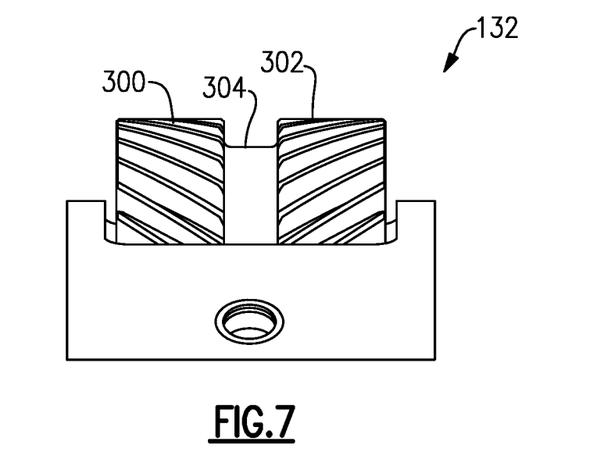
FIG. 7 illustrates portions of a gear.

Referring to FIG. 7, each of the intermediate gears 132 can have two toothed portions 300, 302, which have helical gear teeth extending in opposed directions. A recess or central area 304 is formed between the toothed portions 300, 302. The outer perimeter of the sun gear 128 can have a complementary profile to mate with the toothed portions 300, 302 and establish the meshed interfaces 126 (FIG. 2). Each of the first and second ring gear halves 138A/B can mate with a respective one of the two gear teeth directions of the toothed portions 300, 302 to establish the meshed interfaces 144 (FIG. 2).

Figure 8A:
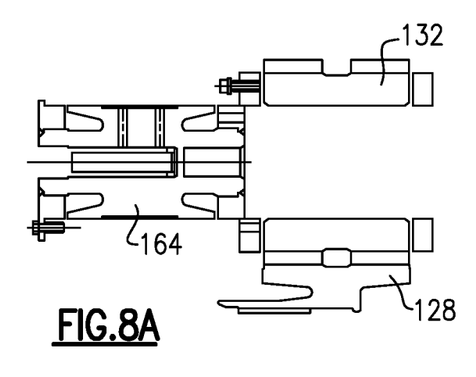
FIG. 8A illustrates an assembly step.
Figure 8B:
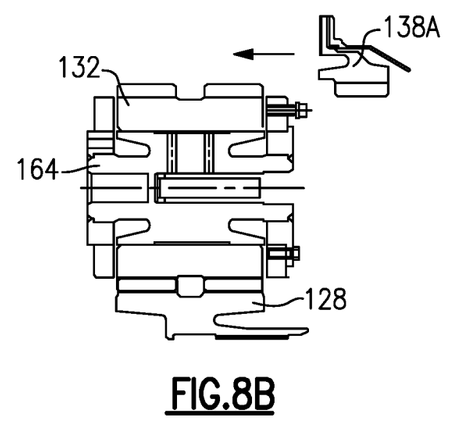
FIG. 8B illustrates a subsequent assembly step.
Figure 8C:
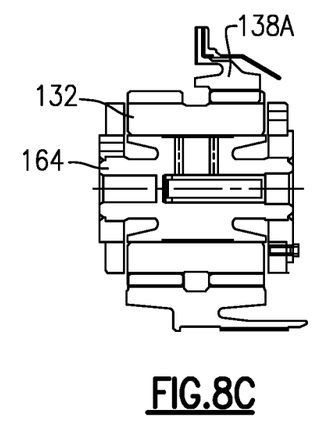
FIG. 8C illustrates another subsequent assembly step.

As shown in FIG. 8A, once the sun gear 128 and intermediate gears 132 are brought in engagement, the journal bearings 164 can be inserted within the intermediate gears 132. As shown in FIG. 8B, the first ring gear half 138A can then be moved onto the outer periphery of the intermediate gears 132. FIG. 8C illustrates the first ring gear half 138A in an installed position.

Figure 8D:
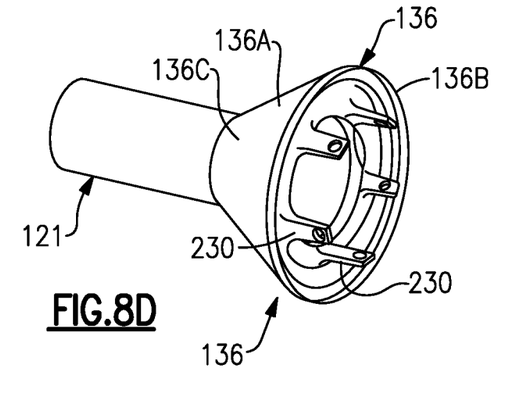
FIG. 8D illustrates a torque frame.
Figure 8E:
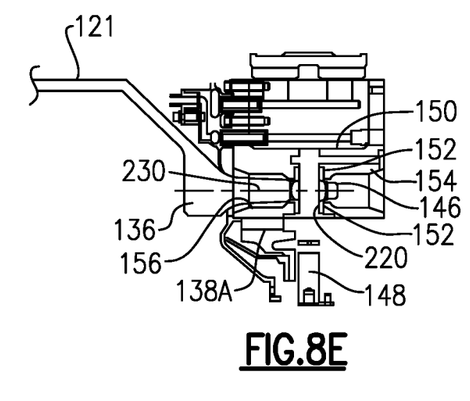
FIG. 8E illustrates a subsequent assembly step.

FIG. 8D is a perspective view of the torque frame 136 according to an example. The torque frame 136 includes a body 136A extending between a first end portion 136B and a second, opposed end portion 136B. The body 136A defines a generally frustro-conical geometry with the first end portion 136B tapering toward second end portion 136C.

The fingers 230 extend away from the first end portion 136B to attach or otherwise secure the torque frame 136 to the carrier 134. The second end portion 136C is coupled to the fan shaft 121 (portion shown for illustrative purposes). In the illustrated example of FIG. 8D, the torque frame 136 is integral with the fan shaft 121. In alternative examples, the torque frame 136 and the fan shaft 121 are separate and distinct components that are mechanically attached to each other.

FIG. 8E illustrates the first ring gear half 138A moved axially such that the first ring gear half 138A does not align with the apertures 220 in the mounts 154, which are to receive respective pins 148 of the torque frame 136. Once each pin 148 has been moved inwardly to lock the respective finger 230 within the slot 156 of the carrier 134 to secure the torque frame 136 to the carrier 134, then the first ring gear half 138A can be moved back axially over a portion of the aperture 220.

Figure 8F:
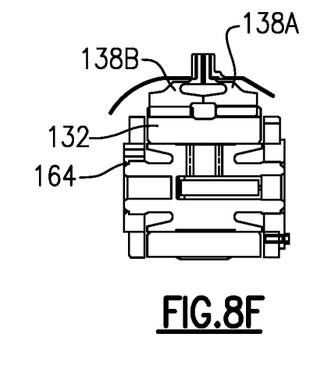
FIG. 8F illustrates another subsequent assembly step.

As shown in FIG. 8F, the next step is to mount the second ring gear half 138B, completing assembly of the gear train 122. At each step, all of the components of the gear train 122 are secured in some manner. An oil gutter can then be installed.

Figure 9:
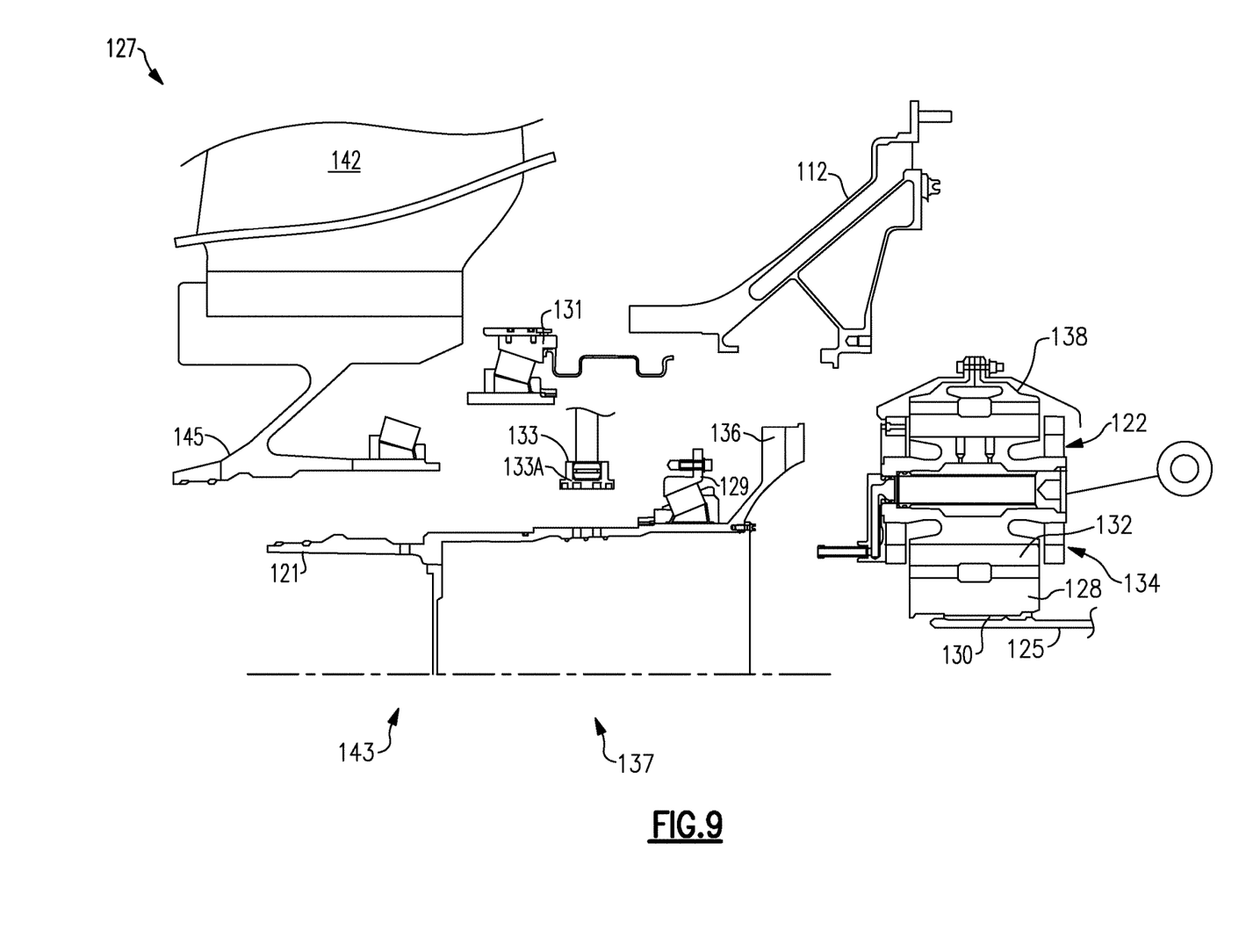
FIG. 9 illustrates assembly steps of a fan drive gear system including mounting the epicyclic gear train of FIG. 2.

FIG. 9 illustrates steps for assembling and mounting the fan drive gear system 127 to the engine static structure 36 and to the fan 142. Once the gear train 122 is assembled, the gear train 122 including carrier 134 is moved along the engine longitudinal axis A. The flexible support 141 can be fixedly attached to and moved together with the ring gear 138. The fan shaft 121 can be moved together with the torque frame 136 along the engine longitudinal axis A (or central axis X), or can be separately attached to the torque frame 136. The fan shaft 121 is fixedly attached or otherwise coupled to the carrier 134 such that the fan shaft 121 and intermediate gears 132 are rotatable about the engine longitudinal axis A. The lubricant manifold 135 can be mechanically attached or otherwise secured to the carrier 134 and/or fan shaft 121 prior to securing the torque frame 136 to the carrier 134.

Once the gear train 122 is positioned, the shaft assembly 143 including bearing system 137 can then be mounted to the gear train 122 and grounded to the engine static structure 36. The first bearing assembly 129 is moved along the engine longitudinal axis A to position the first bearing assembly 129 about an outer periphery of the fan shaft 121. In other examples, the first bearing assembly 129 is situated on the outer periphery of and moved together with the fan shaft 121.

The bearing support 112 is moved along the engine longitudinal axis A and brought into abutment with bearing assembly 129. The bearing assembly 129 can be mechanically attached to the bearing support 112 with one or more fasteners. Then the bearing support 112 is fixedly attached to the engine static structure 36 and the flexible support 141 such that the gear train 122 is grounded to the bearing support 112.

The lubricant transfer bearing assembly 133 is moved along the engine longitudinal axis A to position the bearing assembly 133 about the outer periphery of the fan shaft 121. The second bearing assembly 131 is then moved along the engine longitudinal axis A to position the second bearing assembly 131 about the outer periphery of the fan shaft 121, with the bearing assembly 133 axially between the bearing assemblies 129, 131. Then fan shaft 121 is mechanically attached or otherwise secured to the fan hub 145.

The disclosed arrangement provides a technique for assembling a fan drive gear system including an epicyclic gear train such as a planetary system having a unitary carrier housing. The disclosed gear train, as configured and assembled as disclosed herein, has an improved strength, integrity and rigidity.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples. Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of assembling a fan drive gear system for a turbofan gas turbine engine comprising the steps of:
   providing a unitary carrier defining a central axis, wherein the unitary carrier includes a pair of axially spaced apart side walls and circumferentially spaced mounts that establish circumferentially spaced apart openings at an outer circumference of the carrier, at least one of the walls defines a central opening, and curved walls of adjacent pairs of the mounts establish gear pockets extending radially from the central opening to the respective openings relative to the central axis;
   inserting a plurality of intermediate gears through the central opening, and then moving the intermediate gears radially outwardly relative to the central axis into the respective gear pockets;
   inserting a sun gear through the central opening;
   moving the intermediate gears radially inwardly relative to the central axis to engage the sun gear;
   coupling a fan shaft to the carrier such that the fan shaft and intermediate gears are rotatable about the central axis, including attaching a torque frame to the carrier such that the torque frame interconnects the carrier and the fan shaft;
   wherein the torque frame includes a plurality of axially extending fingers received within slots defined by an axially forward one of the walls of the carrier, at locations circumferentially intermediate locations of the intermediate gears relative to the central axis;
   placing first and second ring gear halves of a ring on an outer periphery of the intermediate gears to engage the intermediate gears, including moving the first ring gear half such that the first ring gear half does not block radially inwardly extending apertures in the outer circumference of the carrier;
   moving pins into the apertures to lock the fingers within the slots, and then moving the first ring gear half over the apertures, wherein the second ring gear half is placed on the intermediate gears subsequent to the locking of the fingers within the slots;
   fixedly attaching the ring gear to an engine static structure subsequent to the placing step, including interconnecting the ring gear and the engine static structure with a flexible support; and
   securing the fan shaft to a fan hub that supports a plurality of fan blades, wherein an outer housing surrounds the fan blades to define a bypass duct.

2. The method as recited in claim 1, further comprising coupling the sun gear to a turbine shaft driven by a fan drive turbine.

3. The method as recited in claim 2, wherein the sun gear and the intermediate gears are each formed as a single gear, the ring gear is formed as a two-part gear including the first ring gear half and the second ring gear half.

4. The method as recited in claim 3, wherein the sun gear and the intermediate gears have two spaced portions, each of the portions having helical gear teeth, the helical gear teeth on the two portions extending in opposed directions, the first and second ring gear halves each having one direction of helical gear teeth, and the helical gear teeth on the first and second ring gear halves extending in opposed directions.

5. The method as recited in claim 4, further comprising:
   inserting journal bearings within each of the intermediate gears subsequent to the step of moving the plurality of intermediate gears radially inwardly.

6. The method as recited in claim 3, further comprising:
   interconnecting the sun gear and the turbine shaft with a flexible input coupling.

7. The method as recited in claim 3, wherein the turbine shaft is an inner shaft concentric with an outer shaft, and the outer shaft interconnects a first compressor and a first turbine.

8. The method as recited in claim 7, further comprising moving a first bearing assembly along an engine longitudinal axis to position the first bearing assembly about an outer periphery of the fan shaft.

9. The method as recited in claim 8, wherein the torque frame defines a frustro-conical geometry includes a first end portion attached to the carrier and that tapers toward a second end portion coupled to the fan shaft.

10. The method as recited in claim 9, wherein the torque frame is integral with the fan shaft.

11. The method as recited in claim 10, further comprising:
    moving a lubricant transfer bearing assembly along the engine longitudinal axis to position the lubricant transfer bearing about the outer periphery of the fan shaft, wherein the lubricant transfer bearing assembly transfers lubricant between the fan shaft and a bearing support in operation; and
    moving a second bearing assembly along the engine longitudinal axis to position the second bearing assembly about the outer periphery of the fan shaft such that the lubricant transfer bearing assembly is positioned between the first and second bearing assemblies.

12. The method as recited in claim 11, further comprising:
    moving the bearing support along the engine longitudinal axis to support the first and second bearing assemblies, and then fixedly attaching the bearing support to the engine static structure.

13. The method as recited in claim 12, wherein the first and second bearing assemblies are tapered bearing assemblies, and further comprising:
    inserting a plurality of journal bearings within each of the intermediate gears after the step of moving the plurality of intermediate gears radially inwardly; and moving a lubricant manifold to interconnect one or more passages in the fan shaft and the journal bearings, wherein the one or more passages are coupled to the lubricant transfer bearing assembly.

14. The method as recited in claim 13, further comprising: positioning baffles between the side walls of the carrier such that an end of each of the baffles abuts a respective one of mounts, wherein each of the baffles includes a curved surface that defines a respective one of the gear pockets.

15. The method as recited in claim 14, wherein each of the baffles includes a first passage that conveys lubricant towards the teeth of an adjacent one of the intermediate gears in operation and a second passage that conveys lubricant towards the teeth of the sun gear in operation.

16. A turbofan gas turbine engine comprising:
a fan section including a fan having a fan hub that carries a plurality of fan blades, a fan shaft coupled to the fan hub, and an outer housing surrounding the fan to define a bypass duct;
a compressor section including a first compressor and a second compressor;
a turbine section including a first turbine and a fan drive turbine; and
a fan drive gear system, wherein the fan drive turbine drives the fan through the fan drive gear system, and the fan drive gear system comprises:
a sun gear, a ring gear, and a plurality of intermediate gears;
a unitary carrier defining a central axis and includes a pair of axially spaced apart side walls and axially extending circumferentially spaced mounts that connect the side walls, wherein at least one of the side walls defines a central opening, the mounts establish circumferentially spaced openings at an outer circumference of the carrier, and internal surfaces of circumferentially spaced curved walls of the mounts define gear pockets that extend away from the central opening;
wherein the intermediate gears are dimensioned to be received through the central opening and secured in the respective gear pockets, with the intermediate gears having teeth engaged with teeth of a sun gear received in the central opening;
wherein the ring gear includes a first ring gear half and a second ring gear half on an outer periphery of the intermediate gears such that the first ring gear half and the second ring gear half engage the teeth of the intermediate gears;
a torque frame interconnecting the carrier and the fan shaft such that the fan shaft and the intermediate gears are rotatable about the central axis; and
wherein the torque frame includes a plurality of axially extending fingers received within slots defined by an axially forward one of the side walls of the carrier relative to an engine longitudinal axis, at locations circumferentially intermediate locations of the intermediate gears relative to the central axis, and pins received in apertures in the outer circumference of the carrier such that the pins lock the fingers within the slots, with the ring gear received radially outwardly of the apertures relative to the central axis; and
a flexible support interconnecting the ring gear and an engine static structure.

17. The turbofan gas turbine engine as recited in claim 16, further comprising an inner shaft and an outer shaft extending along the engine longitudinal axis, the inner shaft interconnecting the sun gear and the fan drive turbine, and the outer shaft interconnecting the second compressor and the first turbine.

18. The turbofan gas turbine engine as recited in claim 17, further comprising a fan pressure ratio of less than 1.45 across the fan blade alone at cruise at 0.8 Mach and 35,000 feet.

19. The turbofan gas turbine engine as recited in claim 18, further comprising a bypass ratio of greater than 10 at cruise at 0.8 Mach and 35,000 feet.

20. The turbofan gas turbine engine as recited in claim 19, wherein the fan drive gear system defines a gear reduction ratio of greater than 2.5.

21. The turbofan gas turbine engine as recited in claim 20, further comprising a flexible input coupling interconnecting the sun gear and inner shaft.

22. The turbofan gas turbine engine as recited in claim 20, wherein the torque frame defines a frustro-conical geometry including a first end portion attached to the carrier and that tapers toward a second end portion coupled to the fan shaft.

23. The turbofan gas turbine engine as recited in claim 22, wherein the torque frame is integral with the fan shaft.

24. The turbofan gas turbine engine as recited in claim 22, wherein the sun gear and the intermediate gears have two spaced portions, each of the portions having helical gear teeth, the helical gear teeth on the two portions extending in opposed directions, the first and second ring gear halves each having one direction of helical gear teeth, and the helical gear teeth on the first and second ring gear halves extending in opposed directions.

25. The turbofan gas turbine engine as recited in claim 24, further comprising:
baffles arranged between the side walls of the carrier such that an end of each of the baffles abuts a respective one of mounts; and
wherein each of the baffles includes a curved surface that defines a respective one of the gear pockets, and each of the baffles includes a first passage that conveys lubricant towards the teeth of an adjacent one of the intermediate gears in operation and a second passage that conveys lubricant towards the teeth of the sun gear in operation.

26. The turbofan gas turbine engine as recited in claim 25, further comprising:
a pair of tapered bearing assemblies about an outer periphery of the fan shaft, wherein the pair of tapered bearings are attached to a bearing support, and the bearing support is attached to an engine static structure; and
a lubricant transfer bearing assembly between the pair of tapered bearing assemblies, wherein the lubricant transfer bearing assembly transfers lubricant between the fan shaft and the bearing support in operation, wherein a lubricant manifold interconnect one or more passages in the fan shaft and journal bearings that support respective ones of the intermediate gears, and the one or more passages are coupled to the lubricant transfer bearing assembly.

27. The turbofan gas turbine engine as recited in claim 26, wherein the inner shaft drives the first compressor and the sun gear.

28. The turbofan gas turbine engine as recited in claim 26, further comprising:
a flexible input coupling interconnecting the sun gear and the inner shaft.

29. The turbofan gas turbine engine as recited in claim 28, wherein the torque frame is integral with the fan shaft.

30. The turbofan gas turbine engine as recited in claim 29, wherein the flexible support selectively engages a deflection limiter to bound circumferential and/or radial movement of the fan drive gear system relative to the engine longitudinal axis.

* * * * *